(12) United States Patent
Vijayan et al.

(10) Patent No.: US 7,746,760 B2
(45) Date of Patent: Jun. 29, 2010

(54) FREQUENCY ERROR ESTIMATION AND FRAME SYNCHRONIZATION IN AN OFDM SYSTEM

(75) Inventors: Rajiv Vijayan, San Diego, CA (US); Alok Kumar Gupta, Carlsbad, CA (US); Raghuraman Krishnamoorthi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1312 days.

(21) Appl. No.: 10/754,796

(22) Filed: Jan. 8, 2004

(65) Prior Publication Data

US 2005/0152326 A1    Jul. 14, 2005

(51) Int. Cl.
*H04J 11/00* (2006.01)
*H04J 3/06* (2006.01)

(52) U.S. Cl. .................. 370/206; 370/503; 375/362; 375/371

(58) Field of Classification Search ............ None
See application file for complete search history.

(56) References Cited

U.S. PATENT DOCUMENTS

| | | | |
|---|---|---|---|
| 5,940,744 A * | 8/1999 | Uda ............................ | 455/75 |
| 6,137,847 A | 10/2000 | Stott et al. | |
| 6,560,298 B1 * | 5/2003 | Froehling et al. ........... | 375/344 |
| 6,618,452 B1 * | 9/2003 | Huber et al. ................ | 375/343 |
| 6,807,147 B1 * | 10/2004 | Heinonen et al. .......... | 370/208 |
| 6,888,880 B2 * | 5/2005 | Lee et al. .................... | 375/149 |
| 6,961,364 B1 * | 11/2005 | Laroia et al. ................ | 375/132 |
| 7,139,333 B2 * | 11/2006 | Tanada et al. .............. | 375/316 |
| 7,170,961 B2 | 1/2007 | Vandenameele-Lepla | |
| 7,292,527 B2 * | 11/2007 | Zhou et al. ................ | 370/203 |

(Continued)

FOREIGN PATENT DOCUMENTS

DE            10353564            3/2007

(Continued)

OTHER PUBLICATIONS

International Search Report PCT/US2005/000400, International Search Authority European Patent Office, Jun. 14, 2005

(Continued)

*Primary Examiner*—Chi H. Pham
*Assistant Examiner*—Soon-Dong D. Hyun
(74) *Attorney, Agent, or Firm*—Sandip S. Minhas; Andrew Newton

(57) ABSTRACT

Frequency error estimation and frame synchronization are performed at a receiver in an OFDM system based on a metric that is indicative of detected pilot power. The metric may be defined based on cross-correlation between two received symbols obtained in two OFDM symbol periods. For frequency error estimation, a metric value is computed for each of multiple hypothesized frequency errors. The hypothesized frequency error for the metric value with the largest magnitude is provided as the estimated frequency error. For frame synchronization, a correlation value is obtained for each OFDM symbol period by correlating metric values obtained for $N_C$ (e.g., most recent) OFDM symbol periods with $N_C$ expected values. The expected values are computed in a manner consistent with the manner in which the metric values are computed. Peak detection is performed on the correlation values obtained for different OFDM symbol periods to determine frame synchronization.

50 Claims, 8 Drawing Sheets

U.S. PATENT DOCUMENTS

2003/0058951 A1    3/2003   Thomson et al.

FOREIGN PATENT DOCUMENTS

| EP | 0683576 A | 11/1995 |
| EP | 1349338 | 10/2003 |
| JP | 2000-341236 | 12/2000 |
| WO | 96019879 | 6/1996 |
| WO | 9965180 A1 | 12/1999 |
| WO | 02062030 | 8/2002 |
| WO | 02078280 | 10/2002 |
| WO | WO02/078280 | 10/2002 |

OTHER PUBLICATIONS

International Preliminary Examination Report PCT/US2005/000400 IPEA/US Nov. 18, 2005.

Written Opinion PCT/US2005/000400, International Search Authority European Patent Office Nov. 18, 2005.

European Search Report EP08012660, European Search Authority The Hague, Aug. 21, 2008.

European Search Report EP08012661, European Search Authority The Hague, Aug. 18, 2008.

* cited by examiner

FREQUENCY ERROR ESTIMATION AND FRAME SYNCHRONIZATION IN AN OFDM SYSTEM

BACKGROUND

I. Field

The present invention relates generally to data communication, and more specifically to techniques for performing frequency error estimation and frame synchronization in an orthogonal frequency division multiplexing (OFDM) communication system.

II. Background

OFDM is a multi-carrier modulation technique capable of providing high performance for some wireless environments. OFDM effectively partitions the overall system bandwidth into multiple ($N_{sb}$) orthogonal subbands, which are also commonly referred to as tones, sub-carriers, bins, and frequency channels. With OFDM, each subband is associated with a respective sub-carrier that may be modulated with data.

In an OFDM system, a transmitter initially codes, interleaves, and modulates a stream of information bits to obtain a stream of modulation symbols. In each OFDM symbol period, $N_{sb}$ "transmit" symbols can be sent on the $N_{sb}$ subbands, where each transmit symbol can be a data symbol (i.e., a modulation symbol for data), a pilot symbol (i.e., a modulation symbol for pilot), or a signal value of zero. The transmitter transforms the $N_{sb}$ transmit symbols to the time domain using an inverse fast Fourier transform (IFFT) and obtains a "transformed" symbol that contains $N_{sb}$ time-domain chips. To combat frequency selective fading (i.e., a frequency response that varies across the $N_{sb}$ subbands), which is caused by multipath in a wireless channel, a portion of each transformed symbol is typically repeated. The repeated portion is often referred to as a cyclic prefix and includes $N_{cp}$ chips. An OFDM symbol is formed by the transformed symbol and its cyclic prefix. Each OFDM symbol contains $N_L$ chips (where $N_L = N_{sb} + N_{cp}$) and has a duration of $N_L$ chip periods, which is one OFDM symbol period (or simply, "symbol period"). The transmitter may transmit the OFDM symbols in frames, with each frame containing multiple ($N_{sym}$) OFDM symbols. The frames of OFDM symbols are further processed and transmitted to a receiver.

The receiver performs the complementary processing and obtains $N_L$ samples for each received OFDM symbol. The receiver removes the cyclic prefix from each received OFDM symbol to obtain a received transformed symbol. The receiver then transforms each received transformed symbol to the frequency domain using a fast Fourier transform (FFT) and obtains $N_{sb}$ "received" symbols for the $N_{sb}$ subbands, which are estimates of the $N_{sb}$ transmit symbols.

The receiver typically performs frequency error estimation to determine the frequency error at the receiver. The frequency error may be due to a difference in the frequencies of the oscillators at the transmitter and receiver, Doppler shift, and so on. The receiver also typically performs frame synchronization to detect for the start of each frame so that a proper sequence of received symbols can be provided for demodulation, deinterleaving, and decoding.

To support frame synchronization, the transmitter typically transmits a training sequence across each frame. This training sequence contains pilot symbols and is transmitted on designated subbands. The receiver processes the training sequence to detect for the start of each frame. The training sequence represents overhead that reduces the efficiency of the system. Moreover, detection performance based on the training sequence is typically not robust, especially at low signal-to-noise ratio (SNR) conditions.

There is therefore a need in the art for techniques for performing frequency error estimation and frame synchronization in an OFDM system.

SUMMARY

Techniques for performing frequency error estimation and frame synchronization in an OFDM system are described herein. These techniques can provide good performance even at low SNR conditions and are based on a metric that is indicative of detected pilot power at the receiver. The metric may be defined in various manners depending on the method used for detecting pilot power. If channel gain estimates are not available, which is typically the case when frequency error estimation is performed, then the pilot power may be detected by (1) cross-correlating two received symbols obtained in two OFDM symbol periods (typically two received symbols for two consecutive OFDM symbol periods), for each of the pilot subbands used for pilot transmission, and (2) accumulating the correlation results for all pilot subbands to obtain a decision statistic. The metric is then defined based on the decision statistic.

For frequency error estimation, a metric value is computed for each of multiple hypothesized frequency errors, which are different possible frequency errors at the receiver. The metric value with the largest magnitude among the metric values for the multiple hypothesized frequency errors is identified. The hypothesized frequency error for this identified metric value is provided as the estimated frequency error at the receiver.

For frame synchronization, a correlation value is obtained for each OFDM symbol period by correlating identified metric values obtained for $N_C$ (e.g., most recent) OFDM symbol periods with $N_C$ expected values. The expected values are computed in a manner consistent with the manner in which the metric values are computed. For example, if the pilot symbols for each pilot subband are scrambled with a pseudo-random number (PN) sequence by the transmitter and the metric values are obtained by cross-correlating pairs of received symbols, then the expected values are obtained by cross-correlating pairs of chips in the PN sequence. Peak detection is performed on the correlation values obtained for different OFDM symbol periods to determine frame synchronization.

Various aspects, embodiments, and features of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
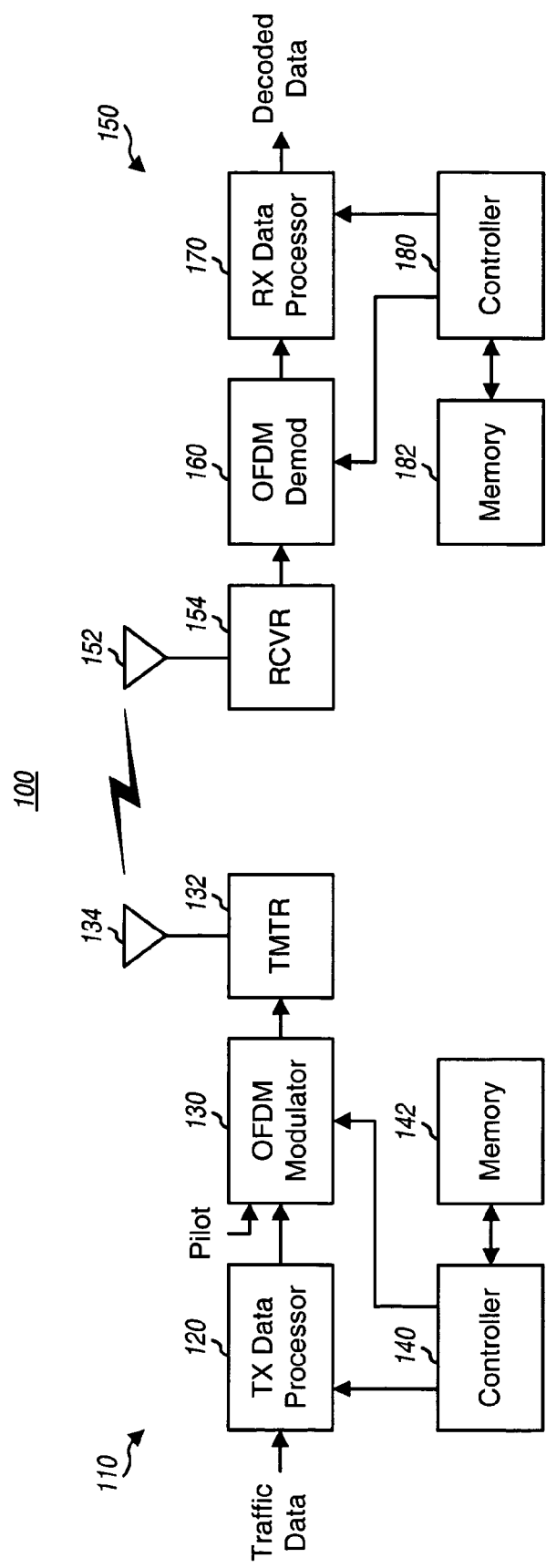
FIG. 1 shows a transmitter and a receiver in an OFDM system.

FIG. 1 shows a block diagram of a transmitter 110 and a receiver 150 in an OFDM system 100. At transmitter 110, a transmit (TX) data processor 120 receives, formats, and codes traffic data (i.e., information bits) to obtain coded data. The coding increases the reliability of the data transmission and may include error detection (e.g., CRC) coding, forward error correction (e.g., convolutional, Turbo, and/or block) coding, or a combination thereof. The coding is typically performed for each data packet, which may have a fixed or variable length. TX data processor 120 then interleaves the coded data to obtain interleaved data. The interleaving provides time and/or frequency diversity against deleterious path effects and may also be performed for each data packet. TX data processor 120 next modulates (i.e., symbol maps) the interleaved data based on one or more modulation schemes (e.g., QPSK, M-PSK, M-QAM, and so on) to obtain data symbols. The same or different modulation schemes may be used for the data and pilot symbols.

An OFDM modulator 130 receives and processes the data and pilot symbols to obtain OFDM symbols. The processing by OFDM modulator 130 may include (1) multiplexing the data symbols, pilot symbols, and zero signal values onto data subbands, pilot subbands, and unused subbands, respectively, to obtain $N_{sb}$ transmit symbols for the $N_{sb}$ subbands for each OFDM symbol period, (2) transforming the $N_{sb}$ transmit symbols for each OFDM symbol period with an $N_{sb}$-point IFFT to obtain a transformed symbol, and (3) appending a cyclic prefix to each transformed symbol to form a corresponding OFDM symbol. The pilot symbols may be multiplexed with the data symbols as described below. OFDM modulator 130 provides frames of OFDM symbols, where each frame contains $N_{sym}$ OFDM symbols and may correspond to an integer number of data packets (e.g., one data packet).

A transmitter unit (TMTR) 132 receives and converts the OFDM symbols into one or more analog signals and further conditions (e.g., amplifies, filters, and frequency upconverts) the analog signal(s) to generate a modulated signal suitable for transmission over a wireless channel. The modulated signal is then transmitted via an antenna 134 to receiver 150.

At receiver 150, the transmitted signal is received by an antenna 152 and provided to a receiver unit (RCVR) 154. Receiver unit 154 conditions (e.g., filters, amplifies, and frequency downconverts) the received signal and digitizes the conditioned signal to obtain a stream of input samples. An OFDM demodulator 160 receives and processes the input samples to obtain received symbols. The processing by OFDM demodulator 160 may include (1) pre-processing the input samples as described below, (2) removing the cyclic prefix appended to each received OFDM symbol to obtain a received transformed symbol, and (3) transforming each received transformed symbol with an $N_{sb}$-point FFT to obtain $N_{sb}$ received symbols for the $N_S$ subbands. The $N_{sb}$ received symbols for each OFDM symbol period include received data symbols for the data subbands and received pilot symbols for the pilot subbands. OFDM demodulator 160 also estimates and corrects for frequency error at the receiver, detects for the start of each frame, performs data detection, and provides a sequence of detected data symbols for each frame, as described below. A receive (RX) data processor 170 then demodulates, deinterleaves, and decodes the detected data symbols to provide decoded data. The processing by OFDM demodulator 160 and RX data processor 170 is complementary to that performed by OFDM modulator 130 and TX data processor 120, respectively, at transmitter 110.

Controllers 140 and 180 direct the operation at transmitter 110 and receiver 150, respectively. Memory units 142 and 182 provide storage for program codes and data used by controllers 140 and 180, respectively.

Figure 2:
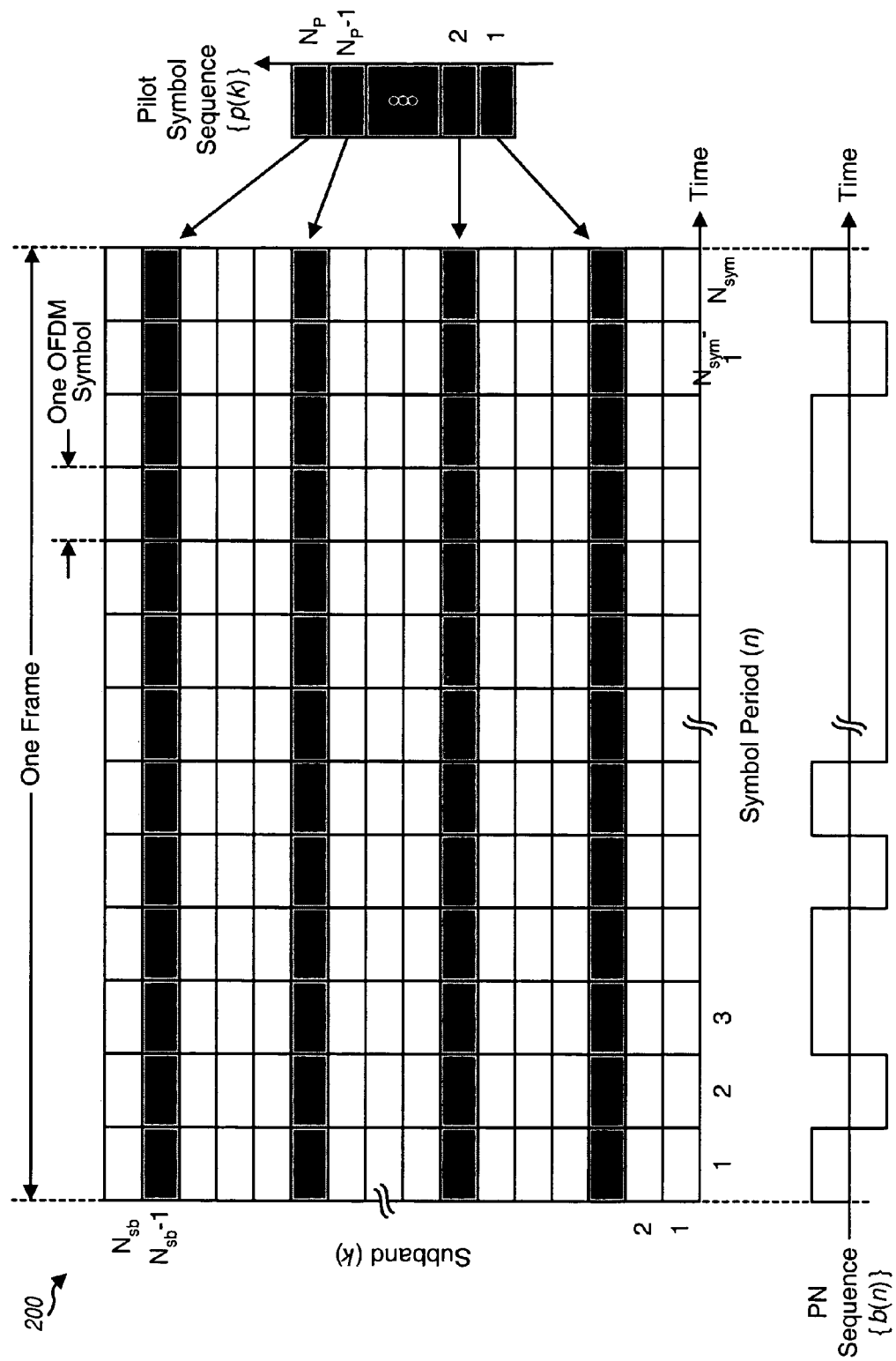
FIG. 2 illustrates pilot and data transmission for one frame using a frequency-time plane.

FIG. 2 illustrates data and pilot transmission for one frame on a frequency-time plane 200. The vertical axis of plane 200 represents frequency and the horizontal axis represents time. The $N_{sb}$ subbands are assigned indices of 1 through $N_{sb}$ on the vertical axis. $N_P$ subbands are used for pilot transmission, where in general $N_{sb} \geq N_P \geq 1$. The pilot subbands are indicated by the shaded boxes in FIG. 2 and may be distributed (e.g., uniformly) across the $N_{sb}$ total subbands. The $N_{sym}$ OFDM symbols for the frame are assigned indices of 1 through $N_{sym}$ on the horizontal axis. Each OFDM symbol includes $N_{sb}$ transmit symbols for the $N_{sb}$ subbands. In the following description, k is a subband index and n is an index for OFDM symbol and OFDM symbol period.

Different OFDM systems may use different values for the various parameters indicated in FIG. 2. As a specific example, an exemplary OFDM system may have an overall system bandwidth of $BW_{sys}=6$ MHz, utilize an OFDM symbol with $N_{sb}=4096$ subbands, allocate $N_P=512$ subbands for pilot, use a cyclic prefix of $N_{cp}=512$ chips, and have a frame length of one second. For this system, each subband has a bandwidth of $BW_{sys}=1.46$ KHz (i.e., 6.0 MHz/4096), each OFDM symbol has a length of $N_L=4608$ chips (i.e., 4096+512), each OFDM symbol period has a duration of 768 μsec (i.e., $4608/6.0 \times 10^6$), and each frame includes $N_{sym}=1302$ OFDM symbols (i.e., $1.0/768 \times 10^{-6}$).

FIG. 2 also shows a frequency division multiplex (FDM) pilot transmission scheme in which pilot symbols are transmitted on pilot subbands and data symbols are transmitted on data subbands. The pilot subbands may be fixed for all OFDM symbol periods or may vary from symbol period to symbol period, frame to frame, and so on. The pilot transmission may also be sent continuously across an entire frame (as shown in FIG. 2) or may be sent only in some OFDM symbol periods. In any case, the subbands used for pilot transmission and the OFDM symbol periods in which the pilot is transmitted are known a priori by both the transmitter and receiver. For simplicity, the following description assumes that the pilot is transmitted continuously on designated pilot subbands, as shown in FIG. 2.

A sequence of $N_P$ pilot symbols is transmitted on the $N_P$ pilot subbands in one OFDM symbol period. The pilot symbol sequence is denoted as $\{p(k)\}$ and includes one pilot symbol for each pilot subband. The same pilot symbol sequence $\{p(k)\}$ is transmitted in each of the $N_{sym}$ OFDM symbol periods for the frame.

To facilitate frame synchronization, the pilot symbols for each pilot subband are scrambled with a PN sequence. The PN sequence is denoted as $\{b_n\}$ and contains $N_{sym}$ PN chips, where each PN chip is either +1 or −1 (i.e., $b_n \in \{1, -1\}$). For each pilot subband, the $N_{sym}$ (same value) pilot symbols for the $N_{sym}$ OFDM symbol periods for the frame are multiplied with the $N_{sym}$ PN chips to obtain $N_{sym}$ scrambled pilot symbols for that pilot subband. The scrambled pilot symbol for each pilot subband of each OFDM symbol period may be expressed as:

$$P_n(k) = p(k) \cdot b_n, \text{ for } k \in P, \qquad \text{Eq (1)}$$

where $P_n(k)$ is the scrambled pilot symbol for pilot subband k in symbol period n; and P is the set of $N_P$ pilot subbands.

$N_P$ scrambled pilot symbol sequences are obtained for the $N_P$ pilot subbands based on the $N_P$ pilot symbols for these subbands and the same PN sequence. The scrambled pilot symbols are multiplexed with the data symbols, processed, and transmitted.

At the receiver, the received symbols after the FFT may be expressed as:

$$R_n(k) = S_n(k) \cdot H_n(k) \cdot e^{j(\theta + 2\pi f n N_L / N_{sb})} + N_n(k), \qquad \text{Eq (2)}$$

where $S_n(k)$ is the transmit symbol for subband k in symbol period n;

$H_n(k)$ is the complex channel gain for subband k in symbol period n;

$N_n(k)$ is the noise for subband k in symbol period n;

$R_n(k)$ is the received symbol for subband k in symbol period n;

θ is an unknown phase offset that is constant across all $N_{sb}$ subbands; and f is a frequency offset (in integer number of subbands) to be estimated.

The transmit symbol $S_n(k)$ may be a pilot symbol $P_n(k)$ or a data symbol $D_n(k)$.

Equation (2) assumes that the fractional frequency error (i.e., of less than one subband) has been estimated and corrected prior to performing the FFT. Fractional frequency error of up to $\pm BW_{sb}/2$ can be estimated based on the cyclic prefix appended to each OFDM symbol or using some other techniques known in the art. Fractional frequency error causes inter-subband interference and is thus estimated and removed with a phase rotator prior to performing the FFT, as described below.

The frequency error f is a large frequency error that may be caused, for example, by different transmitter and receiver oscillator frequencies. The frequency error f is in integer number of subbands since the fractional portion has been corrected prior to the FFT. The integer frequency error f results in transmit symbol $S_n(k)$ sent on subband k being received on subband k+f, i.e., $S_n(k) \Rightarrow R_n(k+f)$. The entire post-FFT spectrum at the receiver is thus shifted by f relative to the pre-IFFT spectrum at the transmitter. The integer frequency error only shifts the spectrum and does not cause inter-subband interference. This frequency error can thus be removed either prior to or after performing the FFT at the receiver. In the following description, "frequency error" and "frequency offset" are synonymous terms that are used interchangeably.

Figure 3:
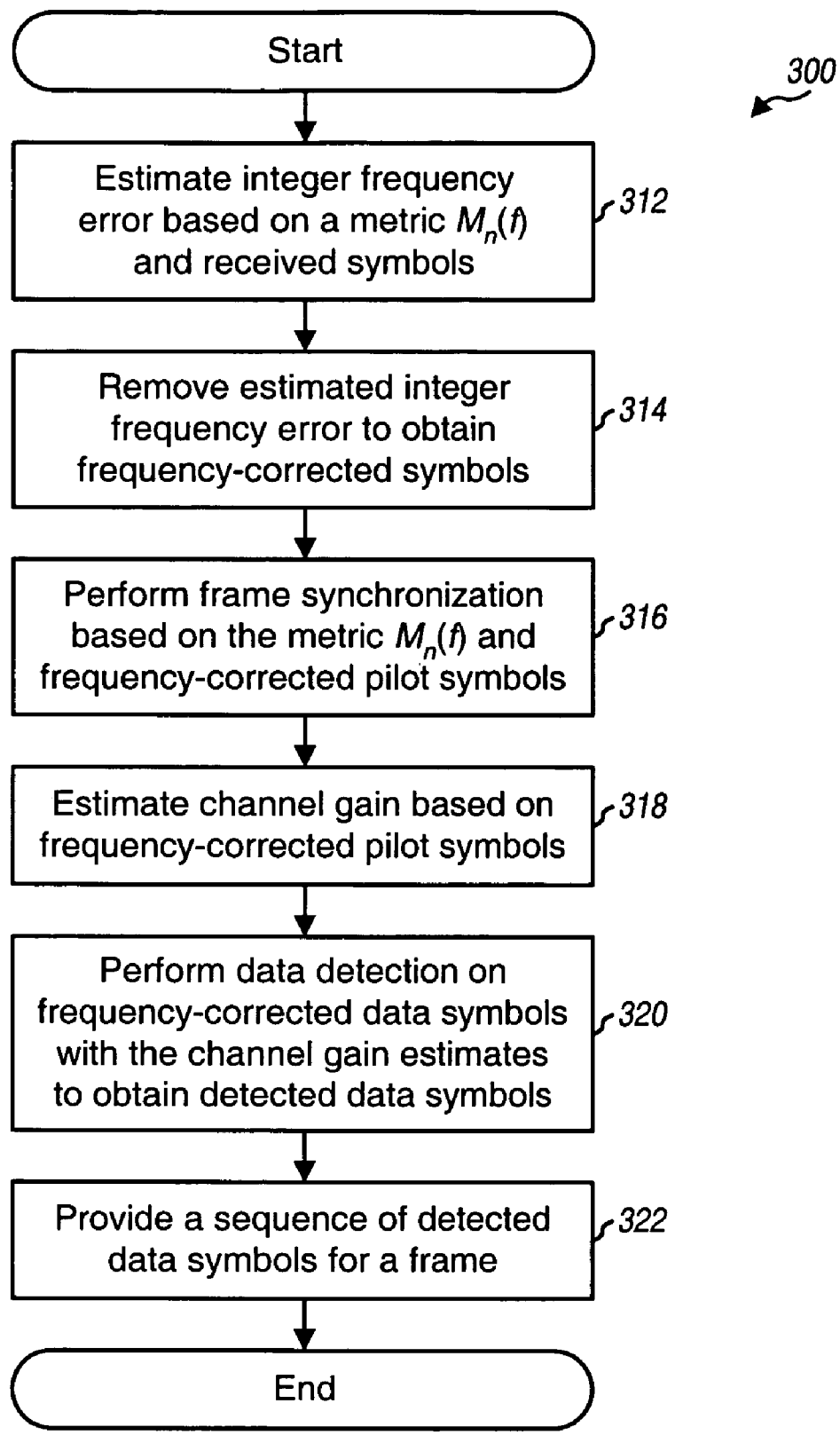
FIG. 3 shows a process for recovering the data symbols for each frame.

FIG. 3 shows a flow diagram of a process 300 for recovering the transmit symbols $S_n(k)$ for a frame. Initially, the integer frequency error f is estimated based on a metric $M_n(f)$ and the received symbols $R_n(k)$, as described below (step 312). The estimated integer frequency error f̂ is then removed to obtain frequency-corrected symbols $\tilde{S}_n(k)$, which include frequency-corrected data symbols $\tilde{D}_n(k)$ (i.e., received data symbols) for the data subbands and frequency-corrected pilot symbols $\tilde{P}_n(k)$ (i.e., received pilot symbols) for the pilot subbands (step 314). Frame synchronization is also performed based on the same metric $M_n(f)$ and the frequency-corrected pilot symbols (step 316).

Once the integer frequency error correction and the frame synchronization have been performed, the channel gain $H_n(k)$ can be estimated based on the frequency-corrected pilot symbols $\tilde{P}_n(k)$ (step 318). Data detection is then performed on the frequency-corrected data symbols $\tilde{D}_n(k)$ with the channel gain estimates $\hat{H}_n(k)$ to obtain detected data symbols $\hat{D}_n(k)$, which are estimates of the data symbols $D_n(k)$ sent by the transmitter (step 320). A proper sequence of detected data symbols for the frame is provided for subsequent processing (step 322). Each of the steps in FIG. 3 is described in further detail below.

For step 312 in FIG. 3, the integer frequency error f is estimated based on the metric $M_n(f)$, which is indicative of the detected pilot power at the receiver. The metric $M_n(f)$ may be defined in various manners, depending on the methods used to detect the pilot power. The receiver may use different methods for pilot power detection depending on whether or not channel gain estimates are available. Several pilot power detection methods are described below.

A cross-correlation method can be used to detect the received pilot power when channel gain estimates are not available at the receiver. This is typically the case at the time the frequency error estimation is performed. For this method, decision statistics for different hypotheses of f may be expressed as:

$$A_n(\tilde{f}) = \sum_{k \in P} R_n(k + \tilde{f}) \cdot R_{n-1}^*(k + \tilde{f}) \cdot e^{-j2\pi \tilde{f} N_L / N_{sb}}, \qquad \text{Eq (3)}$$

for $\tilde{f} \in F$, where $\tilde{f}$ is a hypothesized frequency error;

k+$\tilde{f}$ is a hypothesized subband, which is offset by $\tilde{f}$ from pilot subband k;

$R_n(k+\tilde{f})$ is the received symbol for hypothesized subband k+$\tilde{f}$ in symbol period n;

$A_n(\tilde{f})$ is a decision statistic for hypothesized frequency error $\tilde{f}$ in symbol period n;

F is a set of hypothesized frequency errors to evaluate, i.e., F={0, ±1 ... ±$f_{max}$} where $f_{max}$ is the maximum expected frequency error; and "*" denotes the complex conjugate.

Each of the hypothesized frequency errors in set F is a different possible integer frequency error at the receiver.

In equation (3), the pilot symbols for pilot subband k are assumed to be shifted by the hypothesized frequency error $\tilde{f}$, and the received symbols $R_n(k+\tilde{f})$ and $R_{n-1}(k+\tilde{f})$ for the hypothesized subband k+$\tilde{f}$ (instead of the pilot subband k) are used for the decision statistic. Equation (3) effectively computes a cross-correlation between two received symbols for two consecutive OFDM symbol periods, i.e., $R_n(k+\tilde{f}) \cdot R^*_{n-1}(k+\tilde{f})$. This cross-correlation removes the effect of the wireless channel without requiring the channel gain estimate, which is typically not available yet. Equation (3) then accumulates the cross-correlation results for all $N_P$ pilot subbands to obtain the decision statistic $A_n(\tilde{f})$ for the hypothesized frequency error $\tilde{f}$.

The exponential term $e^{-j2\pi \tilde{f} N_L / N_{sb}}$ in equation (3) accounts for phase difference (i.e., phase shift) between two consecutive OFDM symbols due to the hypothesized frequency error $\tilde{f}$. Different hypothesized frequency errors have different phase shifts. Equation (3) also assumes that the wireless channel is approximately constant or varies slowly over two OFDM symbol periods. This assumption is generally true for most systems. The quality of the decision statistic $A_n(\tilde{f})$ simply degrades if the wireless channel varies more rapidly.

The decision statistic $A_n(\tilde{f})$ is computed for each of the different hypotheses of f. A set of decision statistics $A_n(\tilde{f})$, for $\tilde{f} \in F$, is obtained for all hypothesized frequency errors in set F.

The metric is defined as:

$$M_n(\tilde{f}) = Re\{A_n(\tilde{f})\}. \qquad \text{Eq (4)}$$

The decision statistic $A_n(\tilde{f})$ is generally a complex value and only the real part is used for the metric.

The integer frequency error can be estimated as the hypothesized frequency error that results in the maximum magnitude for the metric. This can be expressed as:

$$\hat{f}_n = \arg\max_{\tilde{f} \in F} |M_n(\tilde{f})|, \qquad \text{Eq (5)}$$

where $\hat{f}_n$ is the estimated integer frequency error determined at OFDM symbol period n. The metric can have both positive and negative values because the pilot symbols are scrambled by the PN sequence $\{a_n\}$. Taking the magnitude of the metric removes the effect of the scrambling.

The integer frequency error can be estimated either once using one pair of OFDM symbols or multiple times using multiple pairs of OFDM symbols. Frequency error typically varies slowly and the same estimated integer frequency error is often obtained for each OFDM symbol pair. Multiple estimates of the integer frequency error can be used to detect for a bad estimate and to provide greater confidence in the estimated integer frequency error. In any case, one estimated integer frequency error $\hat{f}$ is obtained for step 312. Furthermore, the integer frequency error estimation typically only needs to be performed once when the receiver first tunes to the transmitter and a large difference exists between the transmitter and receiver oscillator frequencies.

At the correct hypothesis f, the metric $M_n(f)$ may be expressed as:

$$M_n(f) = a_n \cdot \sum_{k \in P} |H_n(k+f)|^2 \cdot |p(k+f)|^2 + v_n(k+f), \qquad \text{Eq (6)}$$

where $v_n(k+f)$ is a noise term for $M_n(f)$ and may be expressed as:

$$v_n(k+f) = Re\left\{ \sum_{k \in P} R_n(k+f) \cdot N_{n-1}^*(k+f) + R_{n-1}^*(k+f) \cdot N_n(k+f) \right\}, \text{ and} \qquad \text{Eq (7)}$$

$$a_n = b_n \cdot b_{n-1}, \text{ with } b_0 = b_{N_{sym}} \text{ and } a_n \in \{1, -1\}. \qquad \text{Eq (8)}$$

In equations (6) and (8), $a_n$ is the correlation between two PN chips $b_n$ and $b_{n-1}$ for two consecutive OFDM symbol periods, where the PN sequence wraps around.

For an additive white Gaussian noise (AWGN) channel, the channel gain $H_n(k+f)$ can be omitted from equation (6). In this case, the SNR of the metric $M_n(f)$ at the correct hypothesis f may be expressed as:

$$SNR_{fe} = \frac{(N_P \cdot P_S)^2}{N_P \cdot \sigma_v^2} = N_P \cdot \frac{P_S}{\sigma_n^2}, \qquad \text{Eq (9)}$$

where $P_S$ is the transmit power for each pilot symbol, which is $P_S = E\{|p_k|^2\}$, where $E\{x\}$ is the expected value of x;
$\sigma_v^2$ is the variance of the noise $v_n(k+f)$, which is $\sigma_v^2 = \sigma_n^2 \cdot P_S$;
$\sigma_n^2$ is the variance of the noise $N_n(k)$;
$(N_P \cdot P_S)^2$ is the signal power of the metric $M_n(f)$;
$N_P \cdot \sigma_v^2$ is the noise power of the metric $M_n(f)$; and
$SNR_{fe}$ is the SNR of the metric $M_n(f)$.

In equation (9), the ratio $P_S/\sigma_n^2$ is also the SNR of the received data symbols. If the number of pilot subbands is sufficiently large, then the SNR of the metric $M_n(f)$ can be high even when the SNR of the received data symbols is low. For the exemplary OFDM system described above with $N_P=512$, the SNR of the metric $M_n(f)$ is approximately 27 dB when the SNR of the received data symbols is 0 dB (i.e., $SNR_{fe} \approx 27$ dB when $P_S/\sigma_n^2 = 0$ dB). The integer frequency error can thus be reliably estimated based on the metric $M_n(f)$ even at low SNR conditions.

In equation (3), the exponent term is used for phase correction due to the hypothesized frequency error $\tilde{f}$. A simplified decision statistic $A'_n(\tilde{f})$ may be defined without this phase correction term, as follows:

$$A'_n(\tilde{f}) = \sum_{k \in P} R_n(k+\tilde{f}) \cdot R_{n-1}^*(k+\tilde{f}). \qquad \text{Eq (10)}$$

The metric may then be defined as $M_n(\tilde{f}) = A'_n(\tilde{f})$. The integer frequency error can be estimated as shown in equation (5). In general, $A'_n(\tilde{f})$ is a complex value and the square of the magnitude $|A'_n(\tilde{f})|^2$ (instead of the magnitude) can be more easily computed and used for equation (5). It can be shown that the SNR of the metric $M_n(f)$ defined based on $A'_n(\tilde{f})$ is approximately 3 dB worse than the SNR of the metric $M_n(f)$ defined based on $A'_n(\tilde{f})$. This 3 dB degradation in SNR can be compensated by doubling the number of pilot subbands.

A matched filter method can be used to detect for the received pilot power when channel gain estimates are available at the receiver. For this method, the decision statistic may be defined as:

$$A''_n(\tilde{f}) = \sum_{k \in P} R_n(k+\tilde{f}) \cdot P_n^*(k) \cdot \hat{H}_n^*(k+\tilde{f}), \text{ for } \tilde{f} \in F, \qquad \text{Eq (11)}$$

where $\hat{H}_n(k+\tilde{f})$ is the channel gain estimate for hypothesized subband $k+\tilde{f}$. In equation (11), the multiplication by $\hat{H}^*_n(k+\tilde{f})$ removes the effect of the wireless channel, and the multiplication by $P^*_n(k)$ removes the modulation on the pilot symbol. The metric $M_n(f)$ may then be defined to be equal to the real part of the decision statistic $A''_n(\tilde{f})$, i.e., $M_n(\tilde{f}) = Re\{A''_n(\tilde{f})\}$, similar to that shown in equation (4). Other methods may also be used to detect for the received pilot power. The metric is defined based on the decision statistics provided by these methods.

For step 314 in FIG. 3, the estimated integer frequency error f̂ is removed to obtain the frequency-corrected symbols $\tilde{S}_n(k)$. The integer frequency error correction may be performed either prior to or after the FFT at the receiver. For post-FFT frequency error correction, the received symbols $R_n(k)$ are simply translated by f̂ subbands, and the frequency-corrected symbols $\tilde{S}_n(k)$ are obtained as $\tilde{S}_n(k)=R_n(k+\hat{f})$, for all applicable values of k. For pre-FFT frequency error correction, the estimated integer frequency error f̂ can be combined with the fractional frequency error to obtain the total frequency error. The input samples are then phase rotated by the total frequency error, and the FFT is performed on the phase-rotated samples. The frequency of the receiver oscillator can also be adjusted by a phase-locked loop (PLL) to correct for the estimated frequency error f̂.

For step 316 in FIG. 3, frame synchronization is performed based on (1) the same metric $M_n(f)$ used for frequency error estimation and (2) the frequency-corrected pilot symbols $\tilde{P}_n(k)$. The frequency error estimation in step 312 provides the maximum metric value $M_n$ for each OFDM symbol period n, which can be expressed as:

$$M_n = M_n(\hat{f}), \quad \text{Eq (12)}$$

where $M_n(\hat{f})$ may be defined based on either $A_n(\hat{f})$ or $A'_n(\hat{f})$. The simplified decision statistic $A'_n(\hat{f})$ may be used if the integer frequency error is corrected prior to performing the FFT. The $M_n$ metric values are obtained based on the frequency-corrected pilot symbols by the frequency error estimation.

A cross-correlation between the $M_n$ and $a_n$ values is performed for each OFDM symbol period, as follows:

$$C_n = \sum_{i=0}^{N_C-1} M_{n-i} \cdot a_{N_C-i}, \quad \text{Eq (13)}$$

where $N_C$ is the length of the correlation, which is $N_L \geq N_C \geq 1$; and
$C_n$ is the result of the cross-correlation between (1) the $M_n$ values for the $N_C$ most recent OFDM symbol periods and (2) the $a_n$ values for the first $N_C$ OFDM symbol periods in each frame.

Figure 4:
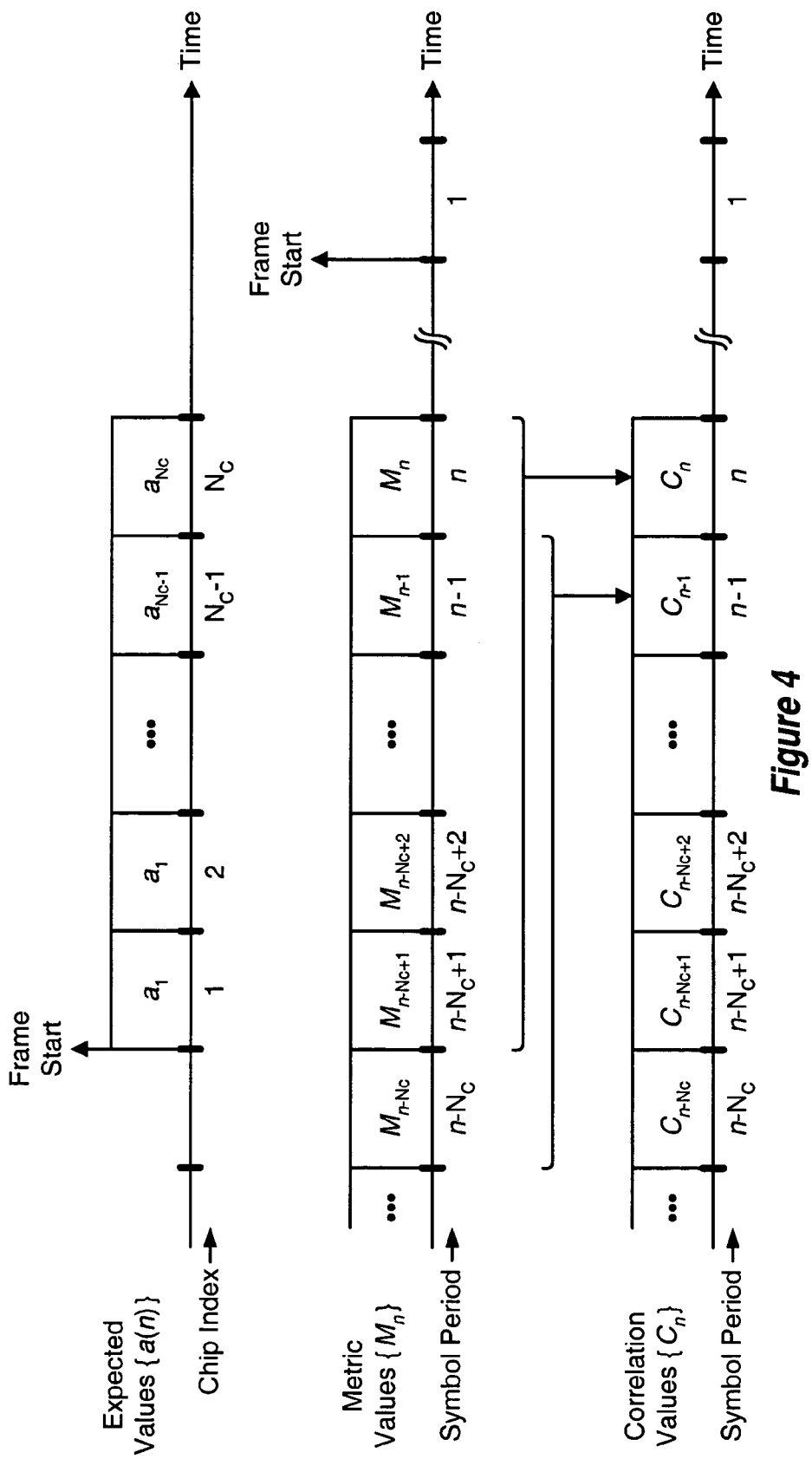
FIG. 4 illustrates the correlation of $M_n$ metric values with $a_n$ expected values for frame synchronization.

FIG. 4 illustrates the correlation between the $M_n$ and $a_n$ values. A truncated sequence with the first $N_C$ $a_n$ values for a frame is shown at the top of FIG. 4 and given indices of 1 through $N_C$. A sequence with the $N_C+1$ most recent $M_n$ values are shown in the middle of FIG. 4 and given indices of $n-N_C$ through n. For each OFDM symbol period n, one $C_n$ correlation value is obtained by correlating the truncated $a_n$ sequence with the $M_n$ sequence for the OFDM symbol period. The $M_n$ sequence effectively shifts to the left when a new $M_n$ value is obtained for the next OFDM symbol period. The $a_n$ sequence remains stationary.

The $a_n$ values are the expected values for the $M_n$ values. For the embodiment described above, the $a_n$ values are defined as $a_n = b_n \cdot b_{n-1}$ because the $M_n$ values are obtained by correlating two consecutive received pilot symbols that are scrambled with two PN chips $b_n$ and $b_{n-1}$. For this embodiment, enhanced performance for frame synchronization may be achieved if the PN sequence $\{b_n\}$ is defined such that the $\{a_n\}$ sequence is also a PN sequence. More particularly, the cross-correlation between the $\{a_n\}$ sequence and its shifted versions should be zero or low except when the two sequences are aligned. For the embodiment in which the $M_n$ values are obtained based on the decision statistic shown in equation (11), the $a_n$ values are simply equal to the $b_n$ values for the PN sequence. In general, the $a_n$ values are dependent on the manner in which the $M_n$ values are obtained.

Peak detection is performed on the $C_n$ correlation values obtained for different OFDM symbol periods to determine the start of a frame. A correlation peak appears when the $M_n$ values are aligned with the $a_n$ values. Peak detection may be performed in various manners. For example, the $C_n$ correlation value for each OFDM symbol period may be compared against a threshold value, and a correlation peak may be declared whenever the correlation value exceeds the threshold value. As another example, a correlation peak may be declared whenever the $C_n$ correlation value exceeds the average or the next highest correlation value by some amount.

The frame synchronization may also be performed to detect for the end of a frame or some other part of the frame. This can be achieved by selecting different portions of the sequence of $a_n$ values corresponding to the part of the frame to be detected. In general, the correlation is between (1) $M_n$ values for $N_C$ OFDM symbol periods "marked" by the current OFDM symbol period n and (2) $a_n$ expected values for the $M_n$ values at a designated OFDM symbol period or portion of the frame.

For an AWGN channel, the correlation between $M_n$ and $a_n$ provides a gain of $N_C$ (the length of the correlation) in the SNR of the $C_n$ correlation value at the peak. Hence, robust detection for frame synchronization is possible even under poor SNR conditions. The correlation length $N_C$ can be selected based on various factors. A larger value for $N_C$ provides greater gain in SNR and greater reliability in frame detection. However, more memory is needed to store the $M_n$ values for the larger value of $N_C$.

To simplify the processing for frame synchronization, the $M_n$ values may be quantized to L bits, where $L \geq 1$. For example, the $M_n$ values may be quantized to one bit by performing hard decisions on these values. The quantized $M_n$ values (denoted as $\hat{M}_n$) may be correlated with the $a_n$ values as shown in equation (13).

If the pilot symbols are scrambled with the PN sequence as described above, then the pilot symbols cannot be recovered until frame synchronization has been performed and the start of the frame is known. The frequency-corrected pilot symbols $\tilde{P}_n(k)$ can then be descrambled by multiplying these symbols with the complex conjugate of the PN sequence. The channel gain $H_n(k)$ can be estimated based on the descrambled pilot symbols.

For step 320 in FIG. 3, data detection is performed on the frequency-corrected data symbols $\tilde{D}_n(k)$, as follows:

$$\hat{D}_n(k) = \frac{\tilde{D}_n(k)}{\hat{H}_n(k)}, \quad \text{Eq (14)}$$

where $\hat{H}_n(k)$ is the channel gain estimate for subband k in symbol period n; and
$\hat{D}_n(k)$ is the detected data symbols for subband k in symbol period n.

The data detection may also be performed in other manners, as is known in the art. The detected data symbols for the frame are provided as one sequence for subsequent processing.

Figure 5:
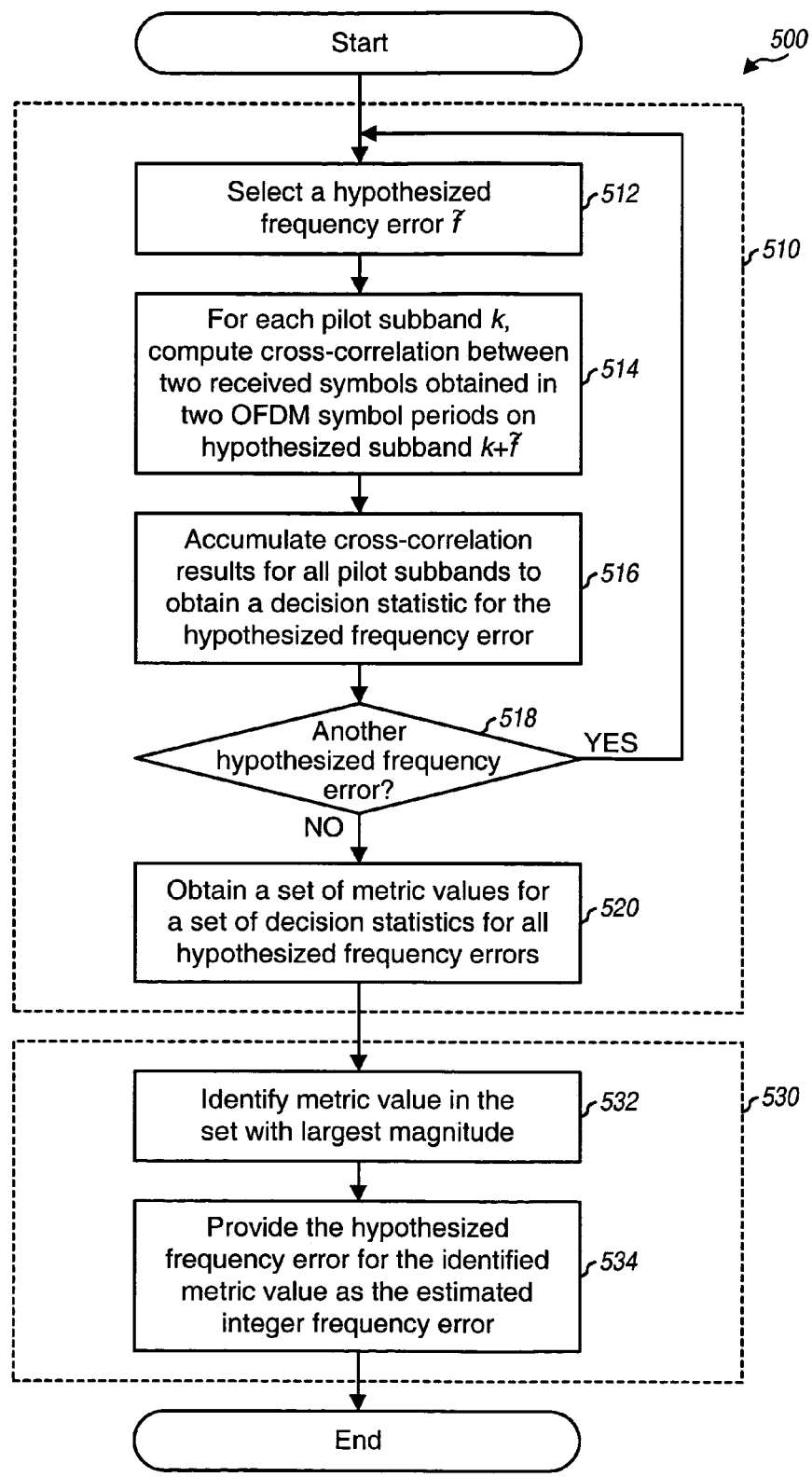
FIG. 5 shows a process for performing integer frequency error estimation.

FIG. 5 shows a flow diagram of a process 500 for performing integer frequency error estimation at the receiver in the OFDM system. Process 500 may be used for step 312 in FIG. 3.

Initially, a value for the metric $M_n(\tilde{f})$ is computed for each of a number of hypothesized frequency errors based on the received symbols (block 510). This can be achieved by selecting a hypothesized frequency error $\tilde{f}$ for evaluation (step 512). For each pilot subband k, a cross-correlation is performed between two received symbols obtained in two consecutive OFDM symbol periods on a hypothesized subband k+$\tilde{f}$ that is offset by $\tilde{f}$ from pilot subband k (step 514). A phase correction term may or may not be included in the cross-correlation, as shown in equations (3) and (10). The cross-correlation results for all pilot subbands are accumulated to obtain a decision statistic $A_n(\tilde{f})$ or $A'_n(\tilde{f})$ for the hypothesized frequency error $\tilde{f}$ (step 516). If all hypothesized frequency errors have not been evaluated (as determined in step 518), then the process returns to step 512 to selected another hypothesized frequency error for evaluation. Otherwise, a set of metric values is obtained from a set of decision statistics obtained for all hypothesized frequency errors that have been evaluated (step 520). The metric may be either the real part of the decision statistic or the entire decision statistic.

The frequency error is then estimated based on the set of metric values (block 530). This is achieved by computing the magnitude (or the square of the magnitude) of each metric value. The metric value in the set with the largest magnitude (or largest squared magnitude) is identified (step 532). The hypothesized frequency error for this identified metric value is provided as the estimated integer frequency error (step 534).

The integer frequency error estimation typically only needs to be performed once, for example, when the receiver first tunes to the transmitter or at the start of a data transmission after a long period of inactivity. Thereafter, the mechanism used to estimate and track out the fractional frequency error can be used to maintain frequency lock at the receiver.

Figure 6:
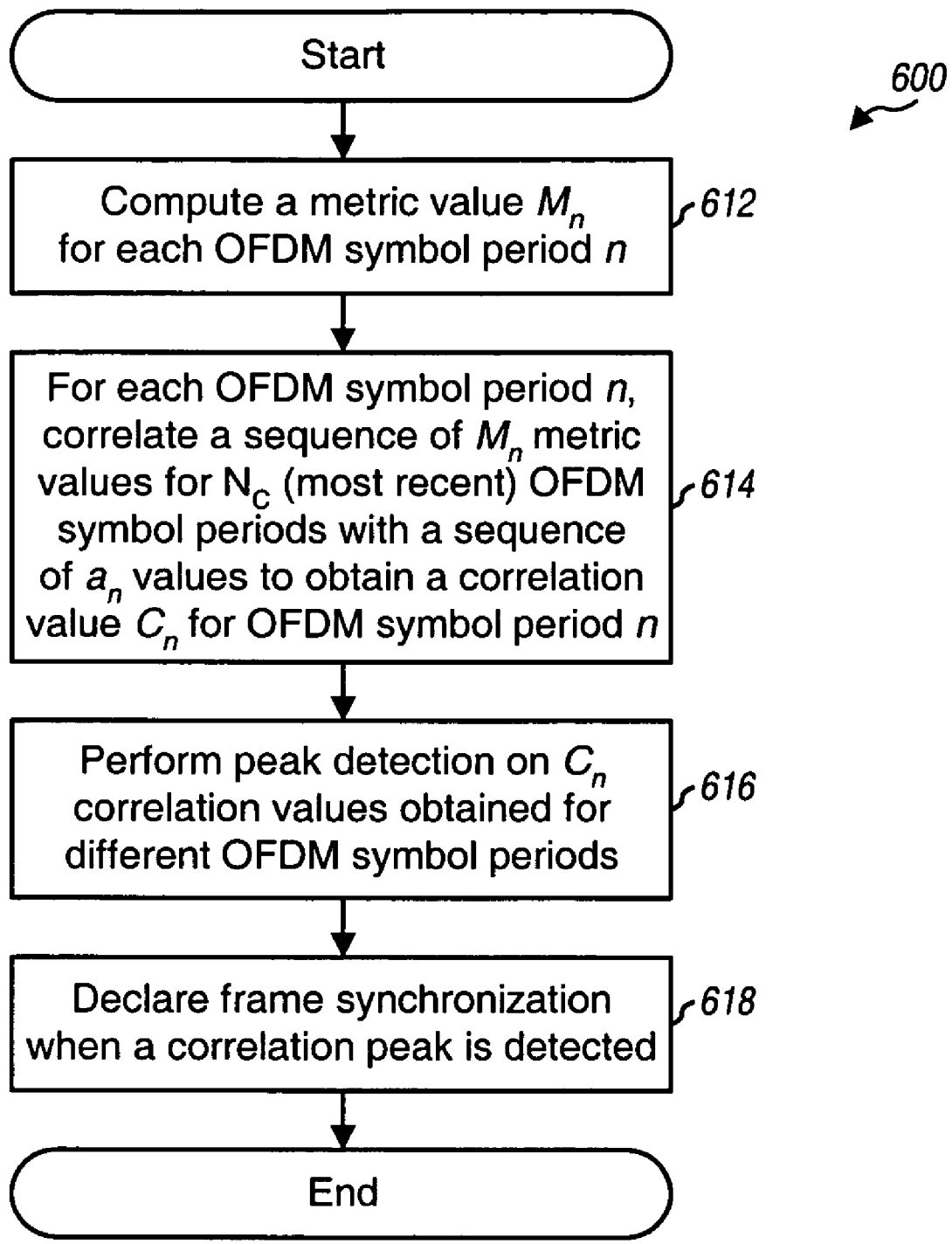
FIG. 6 shows a process for performing frame synchronization.

FIG. 6 shows a flow diagram of a process 600 for performing frame synchronization at the receiver in the OFDM system. Process 600 may be used for step 316 in FIG. 3.

Initially, a metric value $M_n$ is computed for each OFDM symbol period based on the cross-correlation between two received symbols obtained in two consecutive OFDM symbol periods on each pilot subband, as described above (step 612). The metric value $M_n$ is obtained after the integer frequency error f has been estimated and removed either pre-FFT or post-FFT. For each OFDM symbol period, a sequence of $M_n$ values for $N_C$ (e.g., most recent) OFDM symbol periods is correlated with a sequence of $a_n$ values to obtain a $C_n$ correlation value for the OFDM symbol period, as shown in equation (13) (step 614). The $a_n$ values are the expected values for the $M_n$ values at the proper time alignment. Peak detection is then performed on the correlation values obtained for different OFDM symbol periods (step 616). Frame synchronization is declared when a correlation peak is detected (step 618). The detected correlation peak can correspond to the start of a frame or some other part of the frame, depending on the sequence of $a_n$ values used for correlating.

The frame synchronization may be performed on a continual basis, e.g., for each frame. The frame synchronization may also be performed as needed, e.g., at the start of each data burst.

Figure 7:
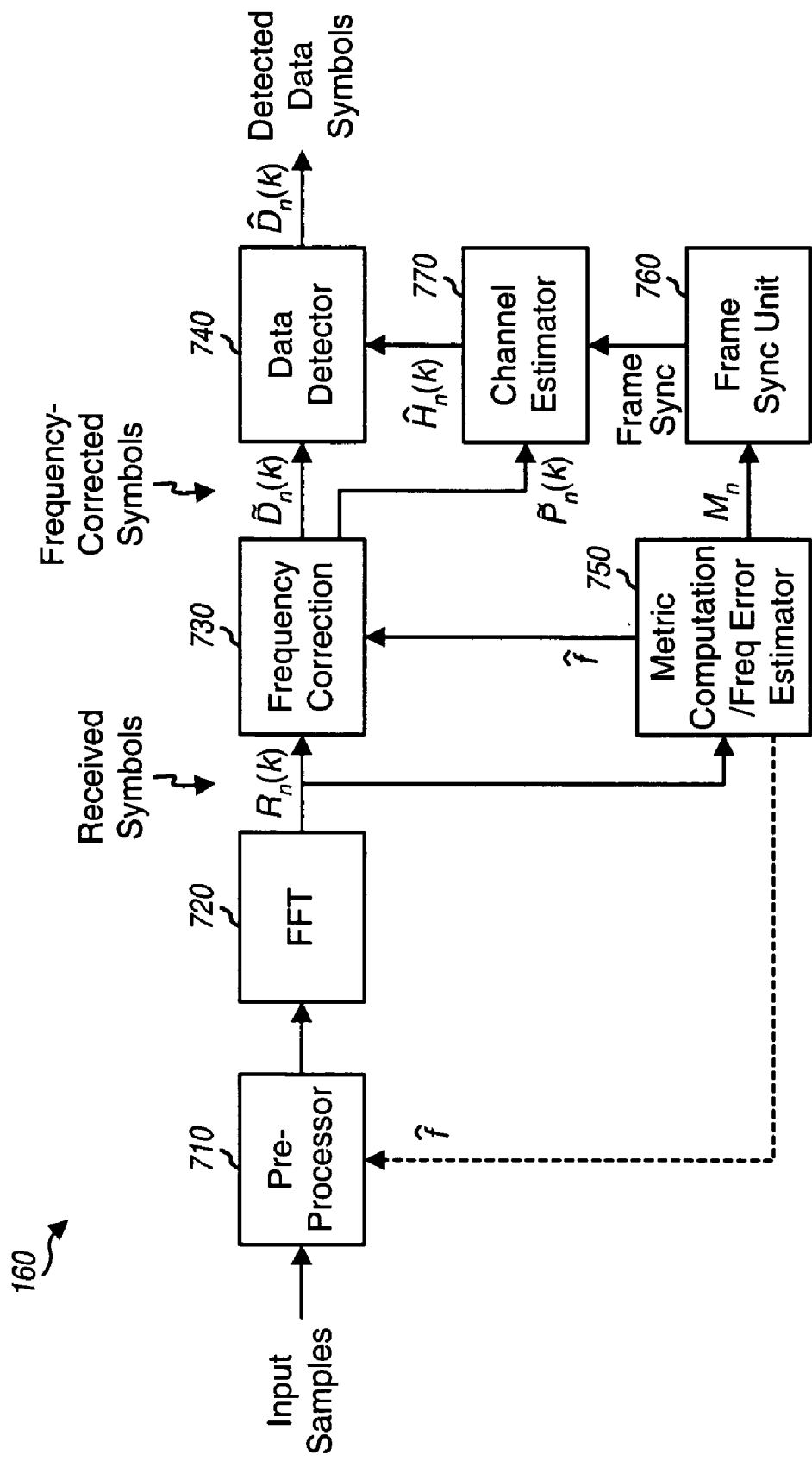
FIG. 7 shows an OFDM demodulator at the receiver.

FIG. 7 shows a block diagram of an embodiment of OFDM demodulator 160 at receiver 150 in FIG. 1. A pre-processor 710 receives and processes the input samples from receiver unit 154 and provides pre-processed samples. Pre-processor 710 may perform sample rate conversion, fractional and possibly integer frequency correction, cyclic prefix removal, and so on, as described below. An FFT unit 720 performs an FFT on the pre-processed samples for each received OFDM symbol to obtain received symbols $R_n(k)$.

A metric computation unit/frequency error estimator 750 estimates the integer frequency error at receiver 150 based on the metric $M_n(\tilde{f})$ and the received symbols $R_n(k)$, as described above. Unit 750 provides the estimated integer frequency error $\tilde{f}$ to either pre-processor 710 or a frequency correction unit 730. Pre-processor 710 can perform pre-FFT integer frequency correction, and frequency correction unit 730 can perform post-FFT integer frequency correction. A frame synchronization unit 760 receives $M_n$ metric values from metric computation unit 750, performs frame synchronization based on these metric values, and provides a Frame Sync signal to a channel estimator 770. The Frame Sync signal indicates the start of each frame.

Frequency correction unit 730 provides frequency-corrected data symbols $\tilde{D}_n(k)$ to a data detector 740 and frequency-corrected pilot symbols $\tilde{P}_n(k)$ to channel estimator 770. Channel estimator 770 descrambles the frequency-corrected pilot symbols based on the Frame Sync signal, estimates the channel gain based on the descrambled pilot symbols, and provides channel gain estimates $\hat{H}_n(k)$ to data detector 740. Data detector 740 performs data detection on the frequency-corrected data symbols with the channel gain estimates as shown in equation (14) and provides detected data symbols $\hat{D}_n(k)$.

Figure 8:
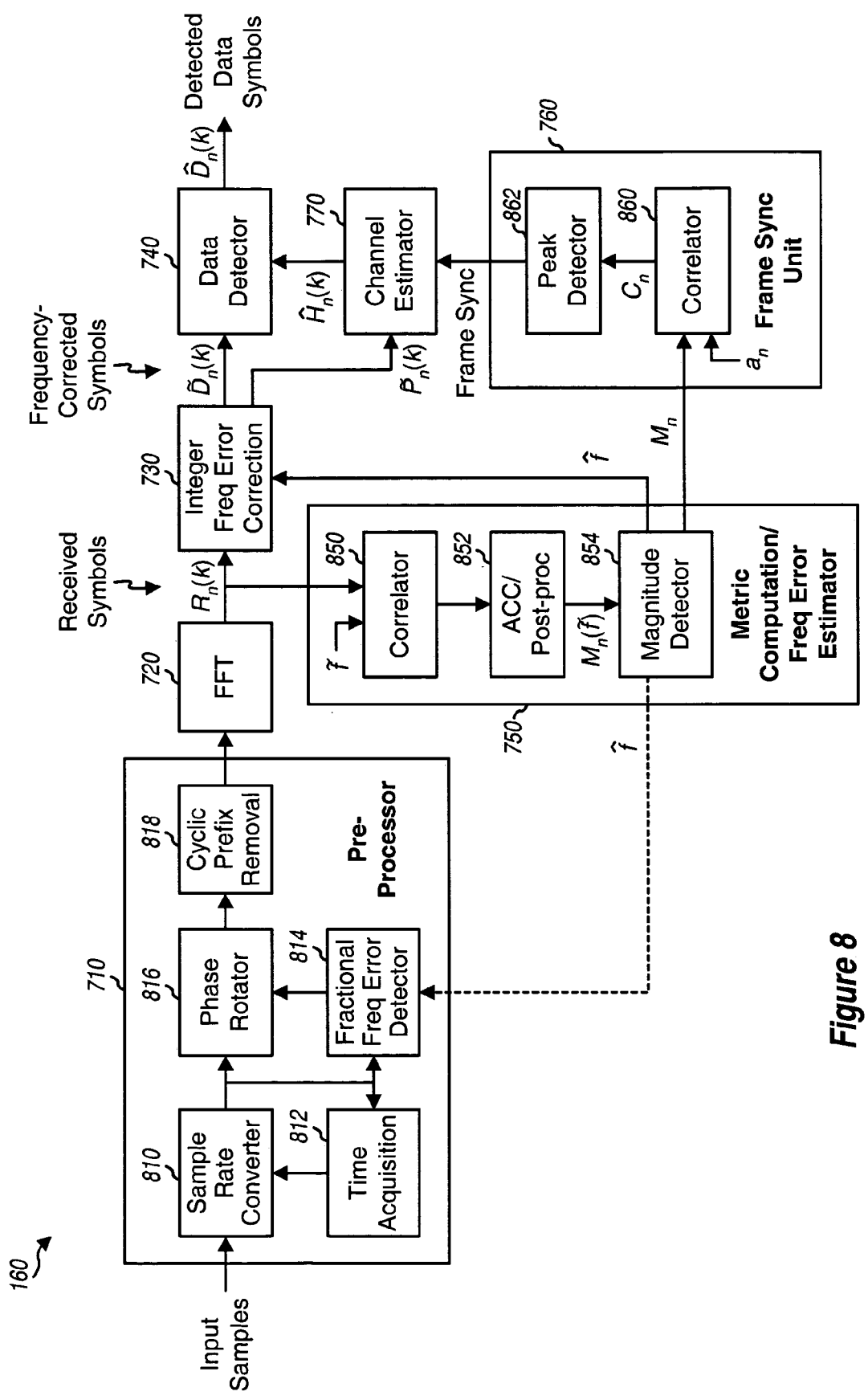
FIG. 8 shows a specific design for the OFDM demodulator.

FIG. 8 shows a block diagram of a specific design for OFDM demodulator 160. Within pre-processor 710, a sample rate converter 810 receives and converts the input samples (at the sampling rate) into interpolated samples (at the chip rate). The chip rate refers to the rate of the chips that make up the OFDM symbols at the transmitter. The sampling rate refers to the rate used by receiver unit 154 to digitize the received signal. The sampling rate is typically selected to be higher than the chip rate to simplify filtering at the receiver. A time acquisition unit 812 acquires the timing of the received OFDM symbols (e.g., based on the cyclic prefix), determines the boundaries of the received OFDM symbols, and provides timing signals to other processing units within OFDM demodulator 160 (not shown in FIG. 8 for simplicity). A fractional frequency error detector 814 estimates the fractional frequency error at the receiver based on the cyclic prefix in the interpolated samples. A phase rotator 816 applies fractional frequency error correction to the interpolated samples and provides frequency-corrected samples. A cyclic prefix removal unit 818 removes the cyclic prefix appended to each OFDM symbol by the transmitter and provides the pre-processed samples.

For the embodiment shown in FIG. 8, metric computation unit/frequency error estimator 750 uses the metric defined based on the cross-correlation method. Within unit 750, a correlator 850 performs cross-correlation on pairs of received symbols obtained in two consecutive OFDM symbol periods on a hypothesized subband k+$\tilde{f}$. For each hypothesized frequency error $\tilde{f}$, the cross-correlation is performed for each of the pilot subbands and may or may not take into account the phase correction for the hypothesized frequency error $\tilde{f}$. An accumulator/post-processing unit 852 accumulates the correlation results for all subbands for each hypothesized frequency error to obtain a decision statistic $A_n(\tilde{f})$ for that hypothesis. Unit 852 provides a metric value $M_n(\tilde{f})$ for each hypothesized frequency error based on the real part of the decision statistic $A_n(\tilde{f})$ or the entire decision statistic $A'_n(\tilde{f})$. Correlator 850 and accumulator 852 form the metric computation unit. A magnitude detector 854 detects for the metric value $M_n(\tilde{f})$ with the largest magnitude for each OFDM symbol period. Detector 854 provides (1) the estimated frequency error f̂ to frequency correction unit 730 or fractional frequency error detector 814 and (2) the $M_n$ metric values to frame synchronization unit 760.

For the embodiment shown in FIG. 8, a correlator 860 within frame synchronization unit 760 correlates the $M_n$ metric values with the $a_n$ values and provides a correlation value $C_n$ for each OFDM symbol period. A peak detector 862 performs peak detection on the $C_n$ correlation values for different OFDM symbol periods and provides the Frame Sync signal.

For clarity, both frequency error estimation and frame synchronization have been described for an exemplary OFDM system. In general, the frequency error estimation techniques described above may be used independently of the frame synchronization. Furthermore, the frame synchronization techniques described above may be used independently of the frequency error estimation, which may be achieved in various manners. The frequency error estimation techniques, or the frame synchronization techniques, or both the frequency error estimation and frame synchronization techniques described herein may be used at the receiver, depending on its design.

The pilot transmission scheme described above supports both frequency error estimation and frame synchronization. Other pilot transmission schemes may also be used. For example, the pilot symbols may be transmitted in a non-continuous manner (i.e., only on designated OFDM symbol periods), on different subbands in different OFDM symbol periods, and so on. The pilot symbols do not need to be scrambled with the PN sequence for frequency error estimation. The metric is defined in a manner corresponding to and consistent with the pilot transmission scheme used by the OFDM system.

The frequency error estimation and frame synchronization techniques described herein may be implemented by various means. For example, these techniques may be implemented in hardware, software, or a combination thereof. For a hardware implementation, the processing units used to perform frequency error estimation and/or frame synchronization may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the frequency error estimation and frame synchronization techniques may be implemented with modules (e.g., procedures, functions, and so on) that perform the functions described herein. The software codes may be stored in a memory unit (e.g., memory unit 182 in FIG. 1) and executed by a processor (e.g., controller 180). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of performing frequency error estimation and frame synchronization by a receiver in an orthogonal frequency division multiplexing (OFDM) communication system, the method comprising:
   estimating, by a processor, frequency error at the receiver based on received symbols and a metric indicative of detected pilot power;
   removing the estimated frequency error to obtain frequency-corrected pilot symbols; and
   performing frame synchronization based on the metric and the frequency-corrected pilot symbols.

2. The method of claim 1, wherein the metric is based on cross-correlation between two received symbols for two symbol periods.

3. The method of claim 1, wherein the metric is based on a decision statistic of a matched filter technique for detecting received pilot power, wherein the decision statistic comprises channel gain estimates.

4. The method of claim 1, wherein the estimating frequency error includes
   computing, for each of a plurality of hypothesized frequency errors, a value for the metric based on the received symbols, wherein each of the hypothesized frequency errors corresponds to a different possible frequency error, at the receiver, and wherein a plurality of metric values are obtained for the plurality of hypothesized frequency errors,
   identifying a metric value with largest magnitude among the plurality of metric values, and
   providing the hypothesized frequency error for the identified metric value as the estimated frequency error.

5. The method of claim 1, wherein the performing frame synchronization includes
   computing a value for the metric for a current symbol period based on frequency-corrected pilot symbols obtained in one or more symbol periods including the current symbol period,
   correlating a plurality of metric values, obtained for a plurality of symbol periods marked by the current symbol period, with a plurality of expected values to obtain a correlation value for the current symbol period, wherein the plurality of expected values are expected values for the plurality of metric values at a designated symbol period, and
   performing peak detection on correlation values obtained for different symbol periods to determine frame synchronization.

6. The method of claim 1, further comprising:
   descrambling the frequency-corrected pilot symbols with a pseudo-random number (PN) sequence to obtain descrambled pilot symbols, wherein the PN sequence is aligned based on the frame synchronization; and
   estimating channel gain based on the descrambled pilot symbols.

7. The method of claim 6, further comprising:
   performing data detection on frequency-corrected data symbols with channel gain estimates to obtain detected data symbols.

8. The method of claim 1, wherein the estimated frequency error is removed by rotating time-domain samples prior to performing fast Fourier transform (FFT) to obtain the received symbols.

9. The method of claim 1, wherein the estimated frequency error is removed by shifting subband indices by the estimated frequency error.

10. A receiver apparatus in an orthogonal frequency division multiplexing (OFDM) communication system, comprising:
a processor;
a frequency error estimator executable by the processor to estimate frequency error at the receiver apparatus based on a metric and received symbols, wherein the metric is indicative of detected pilot power;
a frequency correction unit executable by the processor to remove the estimated frequency error to obtain frequency-corrected pilot symbols; and
a frame synchronization unit executable by the processor to perform frame synchronization based on the metric and the frequency-corrected pilot symbols.

11. A receiver apparatus in an orthogonal frequency division multiplexing (OFDM) communication system, comprising:
means for estimating frequency error at the receiver apparatus based on a metric and received symbols, wherein the metric is indicative of detected pilot power;
means for removing the estimated frequency error to obtain frequency-corrected pilot symbols; and
means for performing frame synchronization based on the metric and the frequency- corrected pilot symbols.

12. A method of performing frequency error estimation by a receiver in an orthogonal frequency division multiplexing (OFDM) communication system, the method comprising:
computing, by a processor and for each of a plurality of hypothesized frequency errors, a value for a metric based on received symbols, wherein the metric is indicative of detected pilot power, wherein each of the hypothesized frequency errors corresponds to a different possible frequency error at the receiver, and wherein a plurality of metric values are obtained for the plurality of hypothesized frequency errors; and
estimating the frequency error at the receiver based on the plurality of metric values.

13. The method of claim 12, wherein the metric is defined based on cross-correlation between two received symbols for two symbol periods.

14. The method of claim 13, wherein the metric value for each hypothesized frequency error is computed by
computing, for each of a plurality of pilot subbands used for pilot transmission, cross-correlation between two received symbols obtained in two symbol periods for a hypothesized subband that is offset by the hypothesized frequency error from the pilot subband,
summing results of the cross-correlation for the plurality of pilot subbands to obtain a decision statistic, and
deriving the metric value for the hypothesized frequency error based on the decision statistic.

15. The method of claim 13, wherein the cross-correlation between the two received symbols for a hypothesized frequency error takes into account phase difference between the two received symbols due to the hypothesized frequency error.

16. The method of claim 12, wherein the metric is based on a decision statistic of a matched filter technique for detecting received pilot power, wherein the decision statistic comprises channel gain estimates.

17. The method of claim 16, wherein the metric value for each hypothesized frequency error is computed by
multiplying, for each of a plurality of pilot subbands used for pilot transmission, a channel gain estimate for a hypothesized subband with a received symbol for the hypothesized subband to obtain a matched filtered symbol for the pilot subband, the hypothesized subband being offset from the pilot subband by the hypothesized frequency error,
summing matched filtered symbols for the plurality of pilot subbands to obtain the decision statistic, and
deriving the metric value for the hypothesized frequency error based on the decision statistic.

18. The method of claim 12, wherein the estimating the frequency error includes
identifying the metric value with largest magnitude among the plurality of metric values, and
providing a hypothesized frequency error for the identified metric value as an estimated frequency error for the receiver.

19. A receiver apparatus in an orthogonal frequency division multiplexing (OFDM) communication system, comprising:
a processor;
a correlation unit executable by the processor to compute, for each of a plurality of hypothesized frequency errors, a value for a metric based on received symbols, wherein the metric is indicative of detected pilot power, wherein each of the hypothesized frequency errors corresponds to a different possible frequency error at the receiver, and wherein a plurality of metric values are obtained for the plurality of hypothesized frequency errors; and
a detector executable by the processor to estimate the frequency error at the receiver apparatus based on the plurality of metric values.

20. The receiver apparatus of claim 19, wherein the correlation unit is operative, for each hypothesized frequency error, to
compute, for each of a plurality of pilot subbands used for pilot transmission, cross-correlation between two received symbols obtained in two symbol periods for a hypothesized subband that is offset by the hypothesized frequency error from the pilot subband,
sum results of the cross-correlation for the plurality of pilot subbands to obtain a decision statistic, and
derive the metric value for the hypothesized frequency error based on the decision statistic.

21. A receiver apparatus in an orthogonal frequency division multiplexing (OFDM) communication system, comprising:
means for computing, for each of a plurality of hypothesized frequency errors, a value for a metric based on received symbols, wherein the metric is indicative of detected pilot power, wherein each of the hypothesized frequency errors corresponds to a different possible frequency error at the receiver apparatus, and wherein a plurality of metric values are obtained for the plurality of hypothesized frequency errors; and
means for estimating the frequency error at the receiver apparatus based on the plurality of metric values.

22. A processor readable medium encoded with computer executable instructions, comprising:
at least one instruction executable by a computer to compute, for each of a plurality of hypothesized frequency errors, a value for a metric based on received symbols, wherein the metric is indicative of detected pilot power, wherein each of the hypothesized frequency errors corresponds to a different possible frequency error at a receiver, and wherein a plurality of metric values are obtained for the plurality of hypothesized frequency errors; and at least one instruction executable by the computer to estimate the frequency error at the receiver based on the plurality of metric values.

23. A method of performing frame synchronization by a receiver in an orthogonal frequency division multiplexing (OFDM) communication system, the method comprising:
computing, by a processor, a value for a metric for a current symbol period based on received pilot symbols for one or more symbol periods including the current symbol period, wherein the metric is indicative of detected pilot power;
correlating a plurality of metric values, obtained for a plurality of symbol periods marked by the current symbol period, with a plurality of expected values to obtain a correlation value for the current symbol period, wherein the plurality of expected values are expected values for the plurality of metric values at a designated symbol period; and
performing peak detection on correlation values obtained for different symbol periods to determine frame synchronization.

24. The method of claim 23, further comprising:
performing frequency error estimation to obtain an estimated frequency error at the receiver, and wherein the metric value for the current symbol period accounts for the estimated frequency error.

25. The method of claim 23, wherein the peak detection is performed by
comparing the correlation value for the current symbol period against a threshold value, and
declaring frame synchronization if the correlation value is greater than the threshold value.

26. The method of claim 23, wherein the metric value for the current symbol period is obtained based on cross-correlation between received pilot symbols for the current symbol period and received pilot symbols for a prior symbol period.

27. The method of claim 23, wherein for each of a plurality of pilot subbands used for pilot transmission, pilot symbols for the pilot subband are scrambled with a pseudo-random number (PN) sequence prior to transmission.

28. The method of claim 27, wherein each of the plurality of expected values is obtained by cross-correlating a respective pair of chips in the PN sequence.

29. A receiver apparatus in an orthogonal frequency division multiplexing (OFDM) communication system, comprising:
a processor;
a metric computation unit executable by the processor to compute a value for a metric for a current symbol period based on received pilot symbols for one or more symbol periods including the current symbol period, wherein the metric is indicative of detected pilot power;
a correlator executable by the processor to correlate a plurality of metric values, obtained for a plurality of symbol periods marked by the current symbol period, with a plurality of expected values to obtain a correlation value for the current symbol period, wherein the plurality of expected values are expected values for the plurality of metric values at a designated symbol period; and
a peak detector executable by the processor to perform peak detection on correlation values obtained for different symbol periods to determine frame synchronization.

30. The receiver apparatus of claim 29, wherein for each of a plurality of pilot subbands used for pilot, transmission, pilot symbols for the pilot subband are scrambled with a pseudo-random number (PN) sequence prior to transmission.

31. The receiver apparatus of claim 30, wherein the metric value for the current symbol period is obtained based on cross-correlation between received pilot symbols for the current symbol period and received pilot symbols for a prior symbol period, and wherein each of the plurality of expected values is obtained by cross-correlating a respective pair of chips in the PN sequence.

32. A receiver apparatus in an orthogonal frequency division multiplexing (OFDM) communication system, comprising:
means for computing a value for a metric for a current symbol period based on received pilot symbols for one or more symbol periods including the current symbol period, wherein the metric is indicative of detected pilot power;
means for correlating a plurality of metric values, obtained for a plurality of symbol periods marked by the current symbol period, with a plurality of expected values to obtain a correlation value for the current symbol period, wherein the plurality of expected values are expected values for the plurality of metric values at a designated symbol period; and
means for performing peak detection on correlation values obtained for different symbol periods to determine frame synchronization.

33. The apparatus of claim 10, wherein the metric is based on cross-correlation between two received symbols for two symbol periods.

34. The apparatus of claim 10, wherein the metric is based on a decision statistic of a matched filter technique for detecting received pilot power, wherein the decision statistic comprises channel gain estimates.

35. The apparatus of claim 10, wherein the frequency error estimator is further configured to:
compute, for each of a plurality of hypothesized frequency errors, a value for the metric based on the received symbols, wherein each of the hypothesized frequency errors corresponds to a different possible frequency error at the receiver, and wherein a plurality of metric values are obtained for the plurality of hypothesized frequency errors,
identify a metric value with largest magnitude among the plurality of metric values, and
provide the hypothesized frequency error for the identified metric value as the estimated frequency error.

36. The apparatus of claim 10, wherein the frame synchronization unit is further configured to:
compute a value for the metric for a current symbol period based on frequency-corrected pilot symbols obtained in one or more symbol periods including the current symbol period,
correlate a plurality of metric values, obtained for a plurality of symbol periods marked by the current symbol period, with a plurality of expected values to obtain a correlation value for the current symbol period, wherein the plurality of expected values are expected values for the plurality of metric values at a designated symbol period, and
perform peak detection on correlation values obtained for different symbol periods to determine frame synchronization.

37. The apparatus of claim 10, wherein the processor is further configured to:
descramble the frequency-corrected pilot symbols with a pseudo-random number (PN) sequence to obtain descrambled pilot symbols, wherein the PN sequence is aligned based on the frame synchronization; and estimate channel gain based on the descrambled pilot symbols.

38. The apparatus of claim 37, wherein the processor is further configured to perform data detection on frequency-corrected data symbols with channel gain estimates to obtain detected data symbols.

39. The apparatus of claim 10, wherein the processor is further configured to remove the estimated frequency error by rotating time-domain samples prior to performing fast Fourier transform (FFT) to obtain the received symbols.

40. The apparatus of claim 10, wherein the processor is further configured to remove the estimated frequency error by shifting subband indices by the estimated frequency error.

41. A processor readable medium encoded with computer executable instructions of performing frequency error estimation and frame synchronization in an orthogonal frequency division multiplexing (OFDM) communication system, the instructions comprising:
   at least one instruction executable by a computer to estimate frequency error based on received symbols and a metric indicative of detected pilot power;
   at least one instruction executable by the computer to remove the estimated frequency error to obtain frequency-corrected pilot symbols; and
   at least one instruction executable by the computer to perform frame synchronization based on the metric and the frequency-corrected pilot symbols.

42. The apparatus of claim 19, wherein the metric is defined based on cross-correlation between two received symbols for two symbol periods.

43. The apparatus of claim 20, wherein the cross-correlation between the two received symbols for a hypothesized frequency error takes into account phase difference between the two received symbols due to the hypothesized frequency error.

44. The apparatus of claim 19, wherein the metric is based on a decision statistic of a matched filter technique for detecting received pilot power, wherein the decision statistic comprises channel gain estimates.

45. The apparatus of claim 44, wherein the metric value for each hypothesized frequency error is computed by
   multiplying, for each of a plurality of pilot subbands used for pilot transmission, a channel gain estimate for a hypothesized subband with a received symbol for the hypothesized subband to obtain a matched filtered symbol for the pilot subband, the hypothesized subband being offset from the pilot subband by the hypothesized frequency error,
   summing matched filtered symbols for the plurality of pilot subbands to obtain the decision statistic, and
   deriving the metric value for the hypothesized frequency error based on the decision statistic.

46. The apparatus of claim 19, wherein the detector is further configured to:
   identify the metric value with largest magnitude among the plurality of metric values, and
   provide a hypothesized frequency error for the identified metric value as an estimated frequency error for the receiver.

47. The apparatus of claim 29, wherein the processor is further configured to:
   perform frequency error estimation to obtain an estimated frequency error at the receiver, and wherein the metric value for the current symbol period accounts for the estimated frequency error.

48. The apparatus of claim 29, wherein the peak detector is further configured to:
   compare the correlation value for the current symbol period against a threshold value, and
   declare frame synchronization if the correlation value is greater than the threshold value.

49. The apparatus of claim 29, wherein the metric value for the current symbol period is obtained based on cross-correlation between received pilot symbols for the current symbol period and received pilot symbols for a prior symbol period.

50. A processor readable medium encoded with computer executable instructions of performing frame synchronization in an orthogonal frequency division multiplexing (OFDM) communication system, the instructions comprising:
   at least one instruction executable by a computer to compute a value for a metric for a current symbol period based on received pilot symbols for one or more symbol periods including the current symbol period, wherein the metric is indicative of detected pilot power;
   at least one instruction executable by the computer to correlate a plurality of metric values, obtained for a plurality of symbol periods marked by the current symbol period, with a plurality of expected values to obtain a correlation value for the current symbol period, wherein the plurality of expected values are expected values for the plurality of metric values at a designated symbol period; and
   at least one instruction executable by the computer to perform peak detection on correlation values obtained for different symbol periods to determine frame synchronization.

* * * * *